US012679779B2

(12) United States Patent
Diggins et al.

(10) Patent No.: US 12,679,779 B2
(45) Date of Patent: Jul. 14, 2026

(54) SYSTEMS AND METHODS OF SEQUESTERING CARBON DIOXIDE IN CONCRETE

(71) Applicant: Innovative Carbon Technologies Inc., Kitchener (CA)

(72) Inventors: Barry John Diggins, Elora (CA); Clive Michael Diggins, Kitchener (CA); Brian Robert Reid, Kitchener (CA)

(73) Assignee: Innovative Carbon Technologies Inc., Kitchener (CA)

( * ) Notice: Subject to any disclaimer, the term of this patent is extended or adjusted under 35 U.S.C. 154(b) by 905 days.

(21) Appl. No.: 17/430,824

(22) PCT Filed: Feb. 10, 2020

(86) PCT No.: PCT/CA2020/050175
§ 371 (c)(1),
(2) Date: Aug. 13, 2021

(87) PCT Pub. No.: WO2020/163945
PCT Pub. Date: Aug. 20, 2020

(65) Prior Publication Data
US 2022/0162129 A1 May 26, 2022

Related U.S. Application Data

(60) Provisional application No. 62/806,337, filed on Feb. 15, 2019.

(51) Int. Cl.
C04B 38/10 (2006.01)
B01D 53/62 (2006.01)
(Continued)

(52) U.S. Cl.
CPC ............ C04B 38/103 (2013.01); B01D 53/62 (2013.01); B28C 5/388 (2013.01); B28C 5/4272 (2013.01);
(Continued)

(58) Field of Classification Search
None
See application file for complete search history.

(56) References Cited

U.S. PATENT DOCUMENTS 4,133,773 A * 1/1979 Simmons ................ B08B 3/003
261/21
4,981,178 A * 1/1991 Bundy ..................... A62C 5/02
261/DIG. 26
(Continued)

FOREIGN PATENT DOCUMENTS

WO      WO2019060992 A1      4/2019

OTHER PUBLICATIONS

European Patent Office, Extended European Search Report, Oct. 20, 2022, European Patent Application No. 20755682.0, Munich, Germany.

(Continued)

*Primary Examiner* — Michael Forrest
(74) *Attorney, Agent, or Firm* — Smart & Biggar LP

(57) ABSTRACT

Systems and methods of sequestering carbon dioxide in concrete are described herein. The methods include combining water and a foaming agent to form a foaming agent mixture, adding a gas comprising carbon dioxide to the foaming agent mixture in a first mixing chamber, mixing the water, the gas comprising carbon dioxide and the foaming agent to form a foam mixture in the first mixing chamber, the foam mixture comprising a plurality of foam bubbles containing the at least a portion of the carbon dioxide, combining the foam mixture with concrete materials in a second
(Continued)

mixing chamber so that the foam mixture contacts the concrete materials, the concrete materials comprising cement, and mixing the foam mixture and the concrete materials in the second mixing chamber to form the concrete having the carbon dioxide sequestered therein.

12 Claims, 3 Drawing Sheets

(51) Int. Cl.

| | |
|---|---|
| B28C 5/38 | (2006.01) |
| B28C 5/42 | (2006.01) |
| B28C 5/46 | (2006.01) |
| C04B 40/00 | (2006.01) |

(52) U.S. Cl.

CPC .......... B28C 5/462 (2013.01); C04B 40/0032 (2013.01); B01D 2251/404 (2013.01); B01D 2251/604 (2013.01); B01D 2257/504 (2013.01); B01D 2258/05 (2013.01); C04B 2201/50 (2013.01)

(56) References Cited

U.S. PATENT DOCUMENTS

| | | | |
|---|---|---|---|
| 5,690,729 A | | 11/1997 | Jones, Jr. |
| 6,046,255 A | * | 4/2000 | Gray ................... B01F 25/4524 |
| | | | 261/DIG. 26 |
| 6,264,736 B1 | | 7/2001 | Knoph et al. |
| 7,390,444 B2 | * | 6/2008 | Ramme ................. C04B 28/021 |
| | | | 264/37.14 |
| 9,388,072 B1 | | 7/2016 | Niven et al. |
| 9,790,131 B2 | | 10/2017 | Lee et al. |
| 2006/0185560 A1 | | 8/2006 | Ramme et al. |
| 2017/0341988 A1 | * | 11/2017 | Welker ................... C04B 18/02 |

OTHER PUBLICATIONS

Canadian Intellectual Property Office, International Search Report and Written Opinion of the International Searching Authority, Apr. 14, 2020, International PCT Application No. PCT/CA2020/050175, Canada.

INAPI—Minsterio de Economia Fomento y Turismo, Inform Pericial, Chile Patent Office, Jan. 6, 2023, Chile Patent Application No. 202102158, Chile.

Intellectual Property India, First Examination Report, Mar. 2, 2023, Indian Patent Application No. 202117041215, Government of India.

Canadian Intellectual Property Office, Examiner's Report dated Feb. 4, 2025, Canadian Patent Application No. 3,130,224.

Servico Publico Federal Ministerio Do Desenvolvimento, Industria , Comercio E Servicos Instituto Nacional Da Propriedade Industrial, Relatorio De Busca, dated Jan. 9, 2024, Brazilian Patent Application No. BR112021016161-9.

Economia, Secretaria de Ecomomia; Direccion Divisional De Patentes, For Patent Application No. MX/a/2021/009822, Office Action issued on Sep. 29, 2025.

* cited by examiner

300

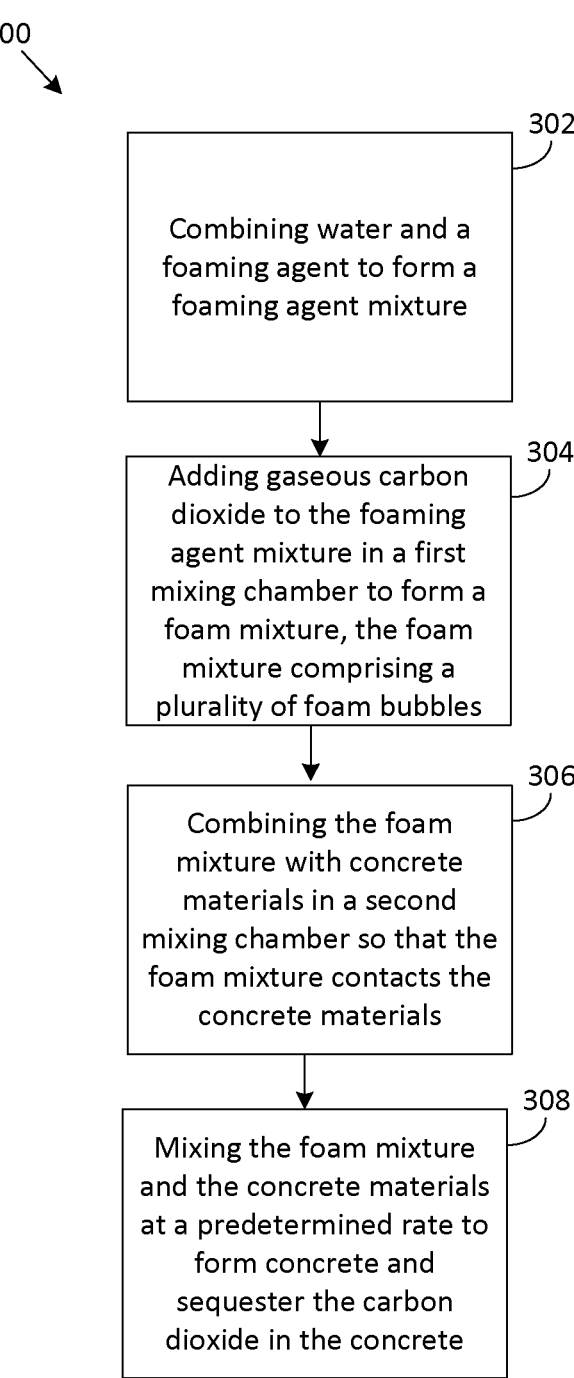

302

Combining water and a foaming agent to form a foaming agent mixture

304

Adding gaseous carbon dioxide to the foaming agent mixture in a first mixing chamber to form a foam mixture, the foam mixture comprising a plurality of foam bubbles

306

Combining the foam mixture with concrete materials in a second mixing chamber so that the foam mixture contacts the concrete materials

308

Mixing the foam mixture and the concrete materials at a predetermined rate to form concrete and sequester the carbon dioxide in the concrete

FIG. 3

SYSTEMS AND METHODS OF SEQUESTERING CARBON DIOXIDE IN CONCRETE

CROSS REFERENCE

This application is a 35 USC § 371 national stage entry of International Patent Application No. PCT/CA2020/050175, filed Feb. 10, 2020, which claims priority to U.S. Provisional Patent Application Ser. No. 62/806,337 entitled Systems and Methods of Sequestering Carbon Dioxide in Concrete, filed 15 Feb. 2019, the entire contents of each of which are hereby incorporated by reference in their entirety.

TECHNICAL FIELD

The embodiments disclosed herein relate to systems and methods of sequestering carbon dioxide and, in particular, to systems and methods of sequestering carbon dioxide in concrete.

BACKGROUND

Carbon dioxide ($CO_2$) is a naturally occurring chemical compound that is present in Earth's atmosphere as a gas. Humans and other living organisms that produce $CO_2$ during respiration are natural sources of atmospheric $CO_2$. Other natural sources of atmospheric $CO_2$ include volcanoes, hot springs, and geysers. Industrial plants are examples of unnatural sources of atmospheric $CO_2$. For example, industrial plants that produce cement to be used in concrete and industrial plants that produce concrete are known to produce large amounts of gaseous $CO_2$.

Elevated atmospheric concentrations of $CO_2$ facilitate storage of heat within the atmosphere and lead to increasing surface temperatures and rapid climate change. In this manner, elevated atmospheric concentrations of $CO_2$ has been identified as a major contributor to global warming.

Several technologies have been developed to sequester or entrain $CO_2$ emissions to reduce atmospheric concentrations of $CO_2$. For example, systems and methods of sequestering or entraining gaseous $CO_2$ in mixed concrete have been developed to reduce $CO_2$ emissions resulting from the production of cement and/or the production of concrete.

For instance, U.S. Pat. No. 9,790,131 B2 describes a method of directly adding liquid or gaseous $CO_2$ to concrete materials (e.g. cement, water and aggregates) prior to the production of concrete. In this method, liquid $CO_2$ is injected into a mixing chamber of a concrete mixer or concrete material container through an injection assembly configured to cause the liquid $CO_2$ to convert to gaseous $CO_2$ upon entering the mixing chamber.

In another example, U.S. Pat. No. 9,388,072 B2 describes a method of carbonating a wet cement mix (e.g. hydraulic cement) by delivering $CO_2$ directly to the wet cement mix while the wet cement mix is mixing. In this method, the $CO_2$ is delivered by a process that comprises converting liquid $CO_2$ to a mixture of gaseous and solid $CO_2$ and contacting the wet cement mix with the mixture of solid and gaseous $CO_2$.

The systems and methods of sequestering $CO_2$ in concrete that have been developed to date have drawbacks or problems. For instance, some systems and methods require retrofitting existing concrete plants with expensive equipment. Other examples only provide for small amounts of $CO_2$ to be added to the concrete. Further, some systems provide off-gassing that reintroduces $CO_2$ into the atmosphere.

Accordingly, there is a need for improved systems and methods of sequestering $CO_2$ in concrete.

SUMMARY

According to some embodiments, a method of sequestering carbon dioxide in concrete is provided herein. The method includes combining water and a foaming agent to form a foaming agent mixture; adding gas comprising carbon dioxide to the foaming agent mixture in a first mixing chamber, the foam mixture comprising a plurality of foam bubbles containing the gas comprising carbon dioxide; combining the foam mixture with concrete materials in a second mixing chamber so that the foam mixture contacts the concrete materials, the concrete materials comprising cement; and mixing the foam mixture and the concrete materials in the second mixing chamber to form the concrete having the carbon dioxide sequestered therein.

During the step of combining the water and the foaming agent, the water may have a pressure in a range of about 10 psi to about 150 psi.

The foaming agent mixture may have a concentration of about 3% to about 10% by weight of foaming agent.

During the step of adding the gas comprising carbon dioxide to the foaming agent mixture, the carbon dioxide may have a pressure in a range of about 1 psi to about 250 psi, or in a range of about 5 psi to about 30 psi, or in a range of about 20 psi to about 30 psi, or in a range of about 25 psi to about 30 psi upon exiting a carbon dioxide reservoir.

During the step of adding the gas comprising carbon dioxide to the foaming agent mixture, the carbon dioxide may have a pressure in a range of about 100 psi to about 150 psi, or in a range of about 125 psi to about 150 psi at the outlet of the compressor.

During the step of adding the gas comprising carbon dioxide to the foaming agent mixture, the carbon dioxide may be blown into the foam mixture at a pressure in a range of about 100 psi to about 150 psi, or in a range of about 125 psi to about 150 psi.

The foaming agent may be a protein-based foaming agent.

The foaming agent may be a synthetic foaming agent.

The plurality of foam bubbles may have an average diameter in a range of about 1 μm to about 1 mm.

The step of combining the foam mixture with the concrete materials in the second mixing chamber may include adding a volume of the foam mixture to the second mixing chamber such that 1 m³ of concrete formed in the second mixing chamber has about 200 L to about 1000 L of the gas comprising carbon dioxide sequestered therein.

The step of combining the foam mixture with the concrete materials in the second mixing chamber may include adding a volume of the foam mixture to the second mixing chamber such that 1 m³ of concrete formed in the second mixing chamber may have about 1000 L of the gas comprising carbon dioxide sequestered therein.

When about 1 m³ of concrete formed in the second mixing chamber has about 1000 L of the gas comprising carbon dioxide sequestered therein, the concrete may have a compressive strength of at least 30 MPa.

The concrete materials may also include an aggregate.

The concrete materials may also include water.

According to some embodiments, a system for sequestering carbon dioxide in concrete is provided herein. The system includes a first mixing vessel having a first mixing chamber configured to: receive water, a gas comprising carbon dioxide and a foaming agent; and mix the water, the gas comprising carbon dioxide and foaming agent to form a foam mixture, the foam mixture comprising a plurality of foam bubbles containing the gas comprising carbon dioxide; and a second mixing vessel having a second mixing chamber configured to: receive concrete materials; receive the foam mixture from the first mixing vessel; and mix the concrete materials and the foam mixture to form concrete having the gas comprising carbon dioxide sequestered therein.

The first mixing vessel may also include a compressor for pressurizing the gas comprising carbon dioxide prior to the gas comprising carbon dioxide being received by the first mixing chamber.

The first mixing vessel may also include a water reservoir configured to provide the water to the first mixing chamber.

The first mixing vessel may also include a water pump configured to receive water from the water reservoir and provide the water to the first mixing chamber.

The first mixing vessel may also include a foam reservoir configured to provide the foam to the first mixing chamber.

The second mixing chamber may be a revolving drum of a cement truck.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 3 is a block diagram showing a method of sequestering carbon dioxide in concrete.

Figure 1:
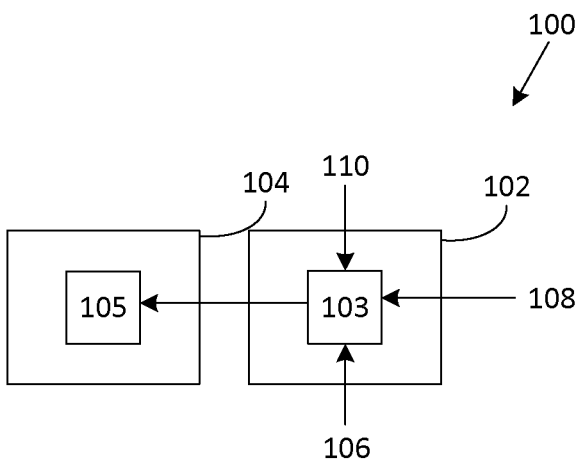
FIG. 1 is a schematic diagram showing a first system for sequestering carbon dioxide in concrete.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various systems or methods will be described below to provide an example of each claimed embodiment. No embodiment described below limits any claimed embodiment and any claimed embodiment may cover systems or methods that differ from those described below. The claimed embodiments are not limited to systems or methods having all of the features of any one systems or methods described below or to features common to multiple or all of the systems or methods described below.

Generally, systems and methods of sequestering carbon dioxide ($CO_2$) in concrete are described herein. $CO_2$ is known to react with calcium present in cement (e.g. Portland cement) and undergo a conversion to a calcium carbonate mineral. Specifically, carbonation occurs when part of the calcium hydroxide formed during hydration of cementitious materials reacts in the course of hardening with the $CO_2$ and produces calcium carbonate in the following reaction:

$$Ca(OH)_2 + CO_2 \rightarrow CaCO_3 + H_2O \qquad (1)$$

In the systems and methods described herein, gaseous $CO_2$, or a gas comprising $CO_2$, is mixed with water and a foaming agent in a first mixing vessel to form a foam mixture that includes foam bubbles enclosing the $CO_2$. The gas comprising $CO_2$ may be pure, or nearly pure. For instance, the gas comprising $CO_2$ may have minimal concentrations of any gases or particulates that would be detrimental to the concrete curing process or to the properties of the cured concrete. The gas comprising $CO_2$ may be a commercially supplied high purity $CO_2$. The gas comprising $CO_2$ may also not be pure, or nearly pure. The gas comprising $CO_2$ may include several other gases or particulates. For instance, the gas comprising $CO_2$ could be an exhaust gas from a vehicle with a combustion engine, such as but not limited to a cement truck. Generally, the other gases may not be detrimental to the curing process of the concrete product. If the gas comprising $CO_2$ includes other gases besides $CO_2$, then the required flow rate and pressure are determined based on the $CO_2$ portion of the gas alone.

The foam mixture is then added to a mixture of concrete materials in a second mixing vessel where the foam mixture and the concrete materials combine to form concrete. The systems described herein are generally closed systems, so all of the $CO_2$ that is injected into the foaming machine is added into the concrete.

The process is of forming the aforementioned foam mixture generally does not require large or cumbersome equipment and may be performed using either a stationary or a mobile system. In embodiments where the system for forming the foam mixture is mobile, once formed, the foam mixture can be directly added to the back of a cement truck at the site of pouring and installing the concrete.

It should be noted that herein the terms "lightweight concrete" or "low strength concrete" refer to concrete having a compressive strength in a range of about 0.2 MPa to about 15 MPa. Generally, "lightweight concrete" or "low strength concrete" may be used in applications such as but not limited to insulative applications (e.g. hydro wire insulation), backfill or voidfill applications (e.g. around a pool), and the like.

Herein the term "medium strength concrete" refers to concrete having a compressive strength in a range of about 15 MPa to about 20 MPa. Generally, "medium strength concrete" may be used in applications such as but not limited to building walls.

Herein the term "high strength concrete" refers to concrete having a compressive strength in a range of about 20 MPa to about 32 MPa. Generally, "high strength concrete" may be used in applications such as but not limited to sidewalks and driveways.

Referring now to FIG. 1, illustrated therein is a system 100 for sequestering $CO_2$ in concrete according to one embodiment. The system 100 includes a first mixing vessel 102 and a second mixing vessel 104.

First mixing vessel 102 may be a stationary mixing vessel or may be a mobile mixing vessel. First mixing vessel 102 includes a mixing chamber 103 configured to receive water from a water source via water stream 106, a gas comprising $CO_2$ from a $CO_2$ source via $CO_2$ stream 108 and a foaming agent from a foaming agent source via a foaming agent stream 110. In some embodiments, the water from water stream 106 may originate from a water source housed in the first mixing vessel 102, the gas comprising $CO_2$ from $CO_2$ stream 108 may originate from a $CO_2$ source housed in the first mixing vessel 102 and/or the foaming agent from the foaming agent stream 110 may originate from a foaming agent source housed in the first mixing vessel 102. In other embodiments, the water from water stream 106 may originate from a water source external to the first mixing vessel 102, the $CO_2$ from $CO_2$ stream 108 may originate from a $CO_2$ source external to the first mixing vessel 102 and/or the foaming agent from the foaming agent stream 110 may originate from a foaming agent source external to the first mixing vessel 102.

Mixing vessel 104 includes a second mixing chamber 105 for mixing the foam mixture with concrete materials. The concrete materials may include a predetermined amount of cement (e.g. Portland cement) and, optionally, a predetermined amount of aggregate (e.g. gravel, crushed stone, sand, slag, recycled concrete and geosynthetic aggregates, etc.), water and/or concrete additives (such as but not limited to plasticizers, strengtheners, etc.).

Figure 2:
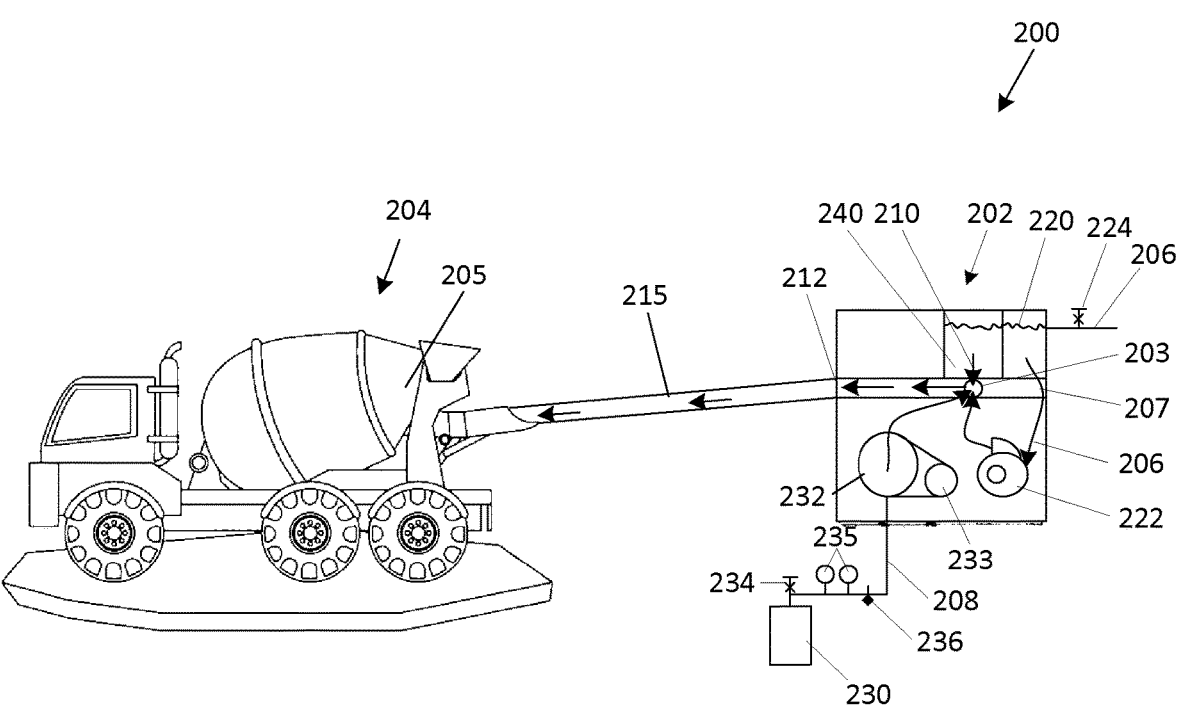
FIG. 2 is a schematic diagram showing a second system for sequestering carbon dioxide in concrete.

Referring now to FIG. 2, illustrated therein is a system 200 for sequestering $CO_2$ in concrete according to another embodiment. In this embodiment, the system 200 includes a first mixing vessel 202 and a second mixing vessel 204, where first mixing vessel 202 is a mobile mixing vessel and second mixing vessel 204 is a cement truck.

As noted above, mixing vessel 202 includes a mixing chamber 203 configured to mix the water, $CO_2$ and foaming agent. In this embodiment, mixing chamber 203 includes a mixing wand 207 for mixing the water, $CO_2$ and foaming agent. For example, the mixing wand 207 can be a venturi-type system where the $CO_2$ gas is blown into a mixture of the water and foaming agent. In other embodiments, mixing chamber 203 may include automated mixing equipment, baffles and the like to mix the water, $CO_2$ and foaming agent.

As shown in FIG. 2, water stream 206 connects a water reservoir 220 and a water pump 222 for pumping water from water reservoir 220 into the mixing chamber 203 of the first mixing vessel 202. Water pump 222 has an independent motor for pumping water into the mixing chamber 203.

Water stream 206 may also include a water source (not shown) external to the mixing vessel 202 and piping connecting the water source to the water reservoir 220. In this embodiment, water stream 206 may include a shut off control and/or float valve 224 between the water source and the mixing chamber 202 to control a flow of water into the reservoir 220. Water stream 206 may also include a backflow preventer (not shown) to inhibit liquid in the mixing chamber 203 from entering the water stream 206. Water stream 206 also may include a meter (not shown) to measure a volume of water being added to the mixing chamber 203.

Water pumped from the water pump 222 into the mixing chamber 203 may have a pressure in a range between about 10 psi and about 150 psi and may have a temperature in a range such as but not limited to about 35° F. to about 105° F., or about 35° F. to about 75° F.

$CO_2$ stream 208 provides a gas comprising $CO_2$ to the mixing chamber 203 for mixing with the water and the foaming agent. $CO_2$ stream 208 may include a $CO_2$ source 230 for storing the $CO_2$ to be provided to the mixing chamber 203. In some embodiments, $CO_2$ source 230 may be for storing $CO_2$ in a gaseous state. In some embodiments, $CO_2$ source 230 may generate $CO_2$. One example of a $CO_2$ source 230 that generates $CO_2$ is a combustion engine.

$CO_2$ added to the mixing chamber 203 is in a gaseous state. In the embodiment shown in FIG. 2, the gas comprising $CO_2$ is pressurized by compressor 232 positioned along $CO_2$ stream 208 between the $CO_2$ source 230 and the mixing chamber 203. Compressor 232 includes a drive motor 233. The gas comprising $CO_2$ at an outlet of the compressor 232 and injected into the mixing chamber 203 may have a pressure in a range between about 1 psi and about 150 psi, or in a range between about 125 psi and about 150 psi, or of about 150 psi.

In other embodiments, the gas comprising $CO_2$ may not be pressurized by compressor 232 before entering the mixing chamber 203. Rather, the gas comprising $CO_2$ may be directly fed to mixing chamber 203 from a $CO_2$ source 230. In these embodiments, the gas comprising $CO_2$ will generally enter the mixing chamber 203 having a pressure equal to a pressure of the gas at $CO_2$ source 230.

As shown in FIG. 2, $CO_2$ stream 208 may also include a shut off valve 234 to control the flow of the gas comprising $CO_2$ from the $CO_2$ source 230, such as to the compressor 232. $CO_2$ stream 208 may also include control gauges 235 to indicate the flow rate and/or pressure of the gas comprising $CO_2$ in the $CO_2$ stream 208 from the $CO_2$ source 230, and/or a pressure reducing valve (PRV) 236 to control the pressure of the gas comprising $CO_2$ from the $CO_2$ source 230 to the compressor 232.

$CO_2$ stream 208 may also include a backflow preventer (not shown) to prevent liquid in the mixing chamber 203 from entering the $CO_2$ stream 208. $CO_2$ stream 208 also may include a meter (not shown) to measure a volume of $CO_2$ being added to the mixing chamber 103.

Foaming agent stream 210 includes a foaming agent reservoir 240 for storing the foaming agent to be provided to the mixing chamber 203. In the embodiment shown in FIG. 2, foaming agent reservoir 240 is directly connected to the mixing chamber 203 for providing the foaming agent into the mixing chamber 203 (e.g. by gravity, by suction or by injection).

Foaming agent stream 210 may include a backflow preventer to prevent liquid in the mixing chamber 203 from entering the foaming agent stream 210. Foaming agent stream 210 also may include a meter to measure a volume of foaming agent being added to the mixing chamber 203.

When the foaming agent is mixed with the water and the $CO_2$, the foaming agent facilitates the formation of a foam. Herein, "foam" refers to a dispersion of gas (e.g. $CO_2$) into a liquid solution. The foam includes a plurality of bubbles of the foaming agent entrapping at least a portion of the gaseous $CO_2$ in the gas comprising $CO_2$. The foam is generally stable at ambient temperatures and includes a plurality of bubbles enclosing at least a portion of the gaseous $CO_2$. The bubbles may be of any size ranging from colloidal bubbles (i.e. between 1 and 1000 nanometers in diameter) to macroscopic bubbles (i.e. visible to the naked eye). The foam has an average bubble size in a range of about 1 μm to about 1 mm.

In some embodiments, the foaming agent is or may comprise a surfactant or a soap, such as but not limited to a concentrated or non-concentrated, synthetic or natural soap. In some embodiments, the foaming agent may be or may comprise a protein-based foaming agent. In other embodiments, the foaming agent may be or may comprise a synthetic foaming agent. In some embodiments, the foaming agent may be or may comprise a commercially available foaming agent such as but not limited to EABASSOC™ synthetic concrete foaming agent or EABASSOC™ protein concrete foaming agent. In some embodiments, 0.3 to 0.6 L of foaming agent may be used per 1 m³ of concrete formed.

In some embodiments, the foaming agent is added to a mixture of the water and the gas comprising $CO_2$ to form the foam. In other embodiments, the gas comprising $CO_2$ is added to a mixture of the foaming agent and water to form the foam.

Generally, mixing is accomplished by compressing the gas comprising $CO_2$ to approximately 150 psi outlet pressure from the compressor 232 (e.g. controlled by pressure reducing valve (PRV) 236, or a throttle valve) which is pushed into a foaming agent mixture having approximately 3% to 10% by weight foaming agent and about 90% to about 97% water. The foaming agent may be gravity fed from the foaming agent reservoir 240 into a water line that is pulled from the water reservoir 220 by the water pump 222 suctioning from the water reservoir 220. This water reservoir 220 may be constantly being replaced with new water from any external water source (e.g. city water, gravity tank, etc.). The foaming agent may also be suctioned from the foaming agent reservoir and pulled into the water and controlled by a needle valve (not shown) that constricts the amount of foaming agent being fed into the water (i.e. such as but not limited to about 10% foaming agent to about 90% water).

The foaming agent mixture including foaming agent and water may then be introduced into the mixing wand 207 where the gas comprising $CO_2$ is being pushed through a venturi (e.g. small hole) (e.g. at a pressure of about 125 to about 150 psi) where it is blown into the foaming agent mixture to form bubbles therein. A ratio of foaming agent to water in the foaming agent mixture determines the size and strength of the bubbles therein.

After the water, the gas comprising $CO_2$, and the foaming agent are mixed in the mixing chamber 203, the resulting foam mixture is removed from the first mixing vessel 202 and transmitted to the second mixing vessel 204 through outlet 212 via foam mixture stream 215.

As shown in FIG. 2, mixing vessel 204 may be a cement truck and include a rotating mixing drum 205 for mixing the foam mixture with concrete materials. Accordingly, system 200 may be appropriate for use on a site immediately prior to pouring concrete mixed in the rotating mixing drum 205. Mixing vessel 204 may also be any other vehicle or mixing tank appropriate for mixing the foam mixture with concrete materials. Mixing drum 205 directly receives the foam mixture from the foam mixture stream 215.

The rate of mixing of the foam mixture of stream 215 and the concrete materials in mixing drum 205 may influence the properties of the concrete formed. Specifically, in the embodiment shown in FIG. 2, the rate of rotation of the rotating mixing drum 205 may influence the properties of the concrete formed in the mixing drum 205. For instance, when the mixing drum 205 rotates slowly (e.g. such as but not limited to a rate of about one turn of the truck drum per two seconds) the concrete formed in the mixing drum 205 may be a lightweight or low strength concrete. When the rotating drum rotates quickly (e.g. such as but not limited to a rate of about two turns of the truck drum per second), the concrete formed in the mixing drum 205 may be a medium strength or high strength concrete. It should be noted that generally, increasing the rate of mixing in the mixing drum 205 (e.g. increasing the rate that mixing drum 205 rotates) increases a strength of the concrete formed therein as the concrete formed therein generally includes fewer gaseous $CO_2$ bubbles.

As noted above, lightweight or low strength concrete may have a compressive strength in a range of about 0.2 MPa to about 15 MPa. Concrete having $CO_2$ sequestered therein having a strength of about 0.2 MPa generally includes larger bubbles than higher strength concretes having $CO_2$ sequestered therein and may act as insulation because of the closed cell $CO_2$ bubbles dispersed throughout the mix.

Medium strength concrete may also have insulative properties provided by $CO_2$ bubbles dispersed throughout the mix. For instance, concrete having a compressive strength of about 18 MPa to about 20 MPa having $CO_2$ sequestered therein formed using the systems and methods described herein may have an R factor of about 0.4 when formed into a wall about one inch thick. Concrete having $CO_2$ sequestered therein having a strength of about 18 MPa is generally strong enough to be used in applications such as but not limited to a basement wall. Concrete having $CO_2$ sequestered therein having a strength of about 18 MPa is generally more fluid (e.g. has lower viscosity) than higher strength concretes and therefore easier to have less voids in a wall. Concrete having $CO_2$ sequestered therein having a strength of about 18 MPa generally has fewer bubbles and smaller bubbles therein when compared to lightweight or low strength concrete having $CO_2$ sequestered therein. Concrete having $CO_2$ sequestered therein having a strength of about 18 MPa is therefore generally denser than lightweight or low strength concrete having $CO_2$ sequestered therein. Bubbles in the concrete having $CO_2$ sequestered therein may provide for walls formed thereof to expand and/or contract with less cracking than other concretes as the bubbles act as a buffering material.

High strength concrete having $CO_2$ sequestered therein formed using the systems and methods described herein may have little or no $CO_2$ bubbles present in the formed concrete because of a weaker foaming agent/water mixture and faster rotation of the mixing drum (e.g. mixing drum 205) during formation of the concrete. In these concretes, $CO_2$ is sequestered in the concrete as a result of the chemical reaction (1) provided above.

In some embodiments, the foaming agent may influence the properties of the concrete formed in the rotating mixing drum 205. For instance, the foaming agent may provide for the bubbles of the foam to survive the mixing process in the rotating mixing drum 205 thus forming a lightweight concrete. In some embodiments, the foaming agent may provide for the bubbles of the foam to remain intact well into a maturing time of the concrete. In these embodiments, the concrete that forms can be referred to as a lightweight concrete.

Once the foaming agent and the concrete materials have been mixed (e.g. for a predetermined amount of time) in the rotating mixing drum 205, the concrete can be poured and/or placed and cured.

Referring now to FIG. 3, illustrated therein is a method 300 of sequestering $CO_2$ in concrete.

At a first step 302, water and foaming agent are combined to form a foaming agent mixture. The water and the foaming agent may be combined with each other at a predetermined rate and/or to achieve a predetermined ratio. Generally, the water and foaming agent are combined such that the resulting foaming agent mixture of water and foaming agent has a concentration of about 3% to about 10% of foaming agent by weight.

At step 304, gaseous $CO_2$ is added to the foaming agent mixture in the first mixing chamber to form a foam mixture, the foam mixture comprising a plurality of bubbles containing the $CO_2$. The foam mixture includes the plurality of foam bubbles of the foaming agent entrapping gaseous $CO_2$.

As noted above, the amounts of the water, $CO_2$ and foaming in the foam mixture may impact the properties of the concrete formed later in the method 300. For instance, increasing a concentration of foaming agent in the foam mixture (e.g. by increasing the rate or amount of foaming agent combined with the water and the $CO_2$ in the mixing chamber) may increase a strength of the bubbles in the foam mixture, which in turn provides for fewer bubbles to rupture during the formation of concrete and to form lightweight concrete.

At step 306, the foam mixture is combined with concrete materials in a second mixing chamber so that the foam mixture contacts the concrete materials. As noted above, the concrete materials include cement (e.g. Portland cement). The concrete materials may also include an aggregate and/or water. In some embodiments, step 306 may occur in a revolving drum 205 of a cement truck 204.

In some embodiments, the foam mixture may be added to the mixing drum 205 in an amount such that concrete formed in the mixing drum has about 80 L to about 120 L of water per 1 m$^3$ of concrete.

In some embodiments, the foam mixture may be added to the mixing drum 205 in an amount such that concrete formed in the mixing drum has about 200 L to about 1000 L of $CO_2$ per 1 m$^3$ of concrete.

At step 308, the foam mixture and the concrete materials are mixed (e.g. at a predetermined rate) to form the concrete and to sequester the $CO_2$ in the concrete.

Generally, lightweight or low strength concretes having $CO_2$ sequestered therein formed using the systems and methods described herein contain about 200 L of $CO_2$ to about 1000 L of $CO_2$ per 1 m$^3$ of concrete, and medium and high strength concretes contain about 500 L of $CO_2$ to about 1000 L of $CO_2$ per 1 m$^3$ of concrete. For instance, concrete having a compressive strength of about 32 MPa having gaseous $CO_2$ sequestered therein formed using the systems and methods described herein may sequester between about 200 L and 1000 L of $CO_2$ per 1 m$^3$ of concrete. Generally, the compressive strength of concrete formed using the systems and methods described herein can be controlled based on factors such as but not limited to the rate of mixing of the concrete materials and the foam mixture in the mixing drum (e.g. mixing drum 205) and the ratio of foaming agent to water in the foaming agent mixture.

EXAMPLES $CO_2$ is an inert gas used in manufacturing processes, food growth, beer and pop manufacturing and in many other applications. For the following examples, pure $CO_2$ was used.

Test: Introduction of $CO_2$ into Foaming Generator/Foam Weight/Timing/Measurement These tests were performed to assess use of $CO_2$ in a foam generator to determine if $CO_2$ will mix with the foaming agent.

EABASSOC™ foaming agent was used on this test and seemed very stable. EABASSOC™ foaming agent was set into the mix at less than ½ of the prior agent (2.5 down to 1, or, more specifically, from a foaming agent concentration in the water of about 8-10 vol % to a foaming agent concentration in the water of about 3-5 vol %).

In this test, the outlet pressure of the $CO_2$ tank was set at 7 psi for the first injection into the inlet of the foaming machine. The outlet hose from the $CO_2$ tank was fed to the compressor intake of the foaming machine, with the shut off valve closed and the outlet pressure at 7 psi. The foaming generator was turned on and the $CO_2$ tank shut off valve was opened to allow $CO_2$ into the suction of the foaming generator compressor. The rate of $CO_2$ introduced into the foaming machine was about 22.5 liters of $CO_2$ per 12 seconds of run time.

After approximately 30 seconds of run time, the $CO_2$ valve was closed and the foaming generator was shut off. The foam stayed intact in the foam generator and stable at the rate that was used.

After successful introduction of $CO_2$ into the EABASSOC™ foaming agent and into the foaming machine, the foam mixture was incorporated into a first concrete test mix. The outlet pressure from the $CO_2$ tank was increased to 22 psi to create enough $CO_2$ outlet flow to flood the intake to the compressor of the foaming machine. This ensured that at least 50% and possibly as much as 100% of the intake mix was $CO_2$, with the remainder of the intake mix being air. The $CO_2$ was being suctioned into the compressor at a greater rate than the air.

In another experiment, 2 m$^3$ a standard 35 MPa concrete mix was prepared in a back of a concrete truck. 40 grams of EABASSOC™ foaming agent was added per litre of water to create a foaming mixture.

1050 L of foam was added to the 2 m$^3$ of standard 35 MPa concrete mix. 55 L of additional water was also added to the 2 m$^3$ of standard 35 MPa concrete mix. The concrete was mixed in the back of the truck and poured into samples for testing.

After 7 days, one concrete sample tested had a compressive strength of 37.0 MPa.

After 28 days, one concrete sample tested had a compressive strength of 49.2 MPa and one concrete sample tested had a compressive strength of 51.0 MPa.

While the above description provides examples of one or more systems and methods, it will be appreciated that other systems or methods may be within the scope of the claims as interpreted by one of skill in the art.

What is claimed is:

1. A method of sequestering carbon dioxide in concrete, the method comprising:

combining water and a foaming agent to form a foaming agent mixture;

adding a gas comprising carbon dioxide to the foaming agent mixture in a first mixing chamber to form a foam mixture in the first mixing chamber, the foam mixture comprising a plurality of foam bubbles containing at least a portion of the carbon dioxide, the foam bubbles have an average diameter in a range of about 1 μm to about 1 mm;

combining the foam mixture with concrete materials in a second mixing chamber so that the foam mixture contacts the concrete materials, the step of combining the foam mixture with the concrete materials including adding a volume of the foam mixture to the second mixing chamber such that 1 m$^3$ of concrete formed in the second mixing chamber has about 1000 L of the gas comprising carbon dioxide sequestered therein, the concrete materials comprising cement; and mixing the foam mixture and the concrete materials in the second mixing chamber to form the concrete having the carbon dioxide sequestered therein.

2. The method of claim 1, wherein during the step of combining the water and the foaming agent, the water has a pressure in a range of about 10 psi to about 150 psi.

3. The method of claim 1, wherein the foaming agent mixture has a concentration in a range of about 3 vol % to about 10 vol % foaming agent.

4. The method of claim 1, wherein during the step of adding the gas comprising carbon dioxide to the foaming agent mixture, the gas comprising carbon dioxide is added to the first mixing chamber from a carbon dioxide reservoir, the gas comprising carbon dioxide having a pressure in a range of about 1 psi to about 250 psi upon exiting the carbon dioxide reservoir.

5. The method of claim 1, wherein during the step of adding the gas comprising carbon dioxide to the foaming agent mixture, the gas comprising carbon dioxide is added to the first mixing chamber from a carbon dioxide reservoir, the gas comprising carbon dioxide having a pressure in a range of about 5 psi to about 60 psi upon exiting carbon dioxide reservoir.

6. The method of claim 1, wherein during the step of adding the gas comprising carbon dioxide to the foaming agent mixture, the gas comprising carbon dioxide is added to the first mixing chamber from a carbon dioxide reservoir, the gas comprising carbon dioxide having a pressure in a range of about 20 psi to about 30 psi upon exiting the carbon dioxide reservoir.

7. The method of claim 4, wherein adding the gas comprising carbon dioxide to the first mixing chamber from the carbon dioxide reservoir includes the gas comprising carbon dioxide through a compressor, the gas comprising carbon dioxide having a pressure in a range of about 100 psi to about 150 psi at an outlet of the compressor.

8. The method of claim 4, wherein adding the gas comprising carbon dioxide to the first mixing chamber from the carbon dioxide reservoir includes passing the gas comprising carbon dioxide through a compressor, the gas comprising carbon dioxide having a pressure in a range of about 125 psi to about 150 psi at an outlet of the compressor.

9. The method of claim 1, wherein adding the gas comprising carbon dioxide to the foaming agent mixture in the first mixing chamber includes blowing the gas comprising carbon dioxide into the foaming agent mixture to form the plurality of foam bubbles containing at least a portion of the carbon dioxide, the gas comprising carbon dioxide having a pressure in a range of about 100 psi to about 150 psi when blown into the foaming agent mixture.

10. The method of claim 1, wherein adding the gas comprising carbon dioxide to the foaming agent mixture in the first mixing chamber includes blowing the gas comprising carbon dioxide into the foaming agent mixture to form the plurality of foam bubbles containing at least a portion of the carbon dioxide, the gas comprising carbon dioxide having a pressure in a range of about 125 psi to about 150 psi when blown into the foaming agent mixture.

11. The method of claim 1, wherein the foaming agent is a protein-based foaming agent or a synthetic foaming agent.

12. The method of claim 1, wherein the concrete is a high strength concrete having a compressive strength of at least 30 MPa.

* * * * *